Patented May 5, 1953

2,637,728

UNITED STATES PATENT OFFICE 2,637,728

METHOD FOR THE PROTECTION OF ALCOHOLIC STEROID HYDROXYL GROUPS

Arnold C. Ott and Maxton F. Murray, Kalamazoo, Mich., assignors to The Upjohn Company, Kalamazoo, Mich., a corporation of Michigan No Drawing. Application August 18, 1949, Serial No. 111,097

29 Claims. (Cl. 260—239.55)

This invention relates to a method for the protection of hydroxyl groups attached to a nuclear alicyclic ring of a steroid compound, and is more particularly concerned with such method which consists in the formation of the 2-tetrahydropyranyl ether of the nuclear alcoholic hydroxyl group to be protected, and with 2-tetrahydropyranyl ethers thus formed.

The necessity for the protection of one or more nuclear alcoholic hydroxyl groups of steroid compounds during various chemical reactions is well established in the field of cyclopentanopolyhydrophenanthrene chemistry. When a reaction, or series of reactions, which demands protection of nuclear steroid hydroxyl groups, has been completed, the problem of removing any of the now employed protecting groups to reestablish the hydroxyl group, without at the same time causing other transformations in the molecule, is at times incapable of a satisfactory solution.

It is, therefore, an object of the present invention to provide a novel method of protecting nuclear alcoholic steroid hydroxyl groups. A further object of the invention is the provision of such process which involves formation of the 2-tetrahydropyranyl ether of the hydroxyl group to be protected. Another object of the invention is the provision of the novel 2-tetrahydropyranyl ethers thus formed. Other objects will become apparent hereinafter.

The method of the present invention, for the protection of nuclear alcoholic hydroxyl groups in a steroid compound by formation of the tetrahydropyranyl ether, is of particular value in that the protecting group can be introduced and removed under such mild reaction conditions that the extent of other changes in the molecule is remarkably reduced as compared with the extent of changes undergone with the employment of other presently known and used methods for the protection of alcoholic hydroxyl groups in a steroid molecule.

The tetrahydropyranyl ethers of this invention can be hydrolyzed to give the hydroxy steroid by heating the tetrahydropyranyl ether under reflux for about an hour with dilute aqueous-alcoholic acid, preferably about six-tenths per cent hydrochloric acid. The extremely mild conditions of hydrolysis of the tetrahydropyranyl ethers, as compared to the more strenuous conditions required by many of the commonly used hydrolytic procedures for removal of the hydroxyl protecting groups, is one of the outstanding advantages of the protective procedure herein described.

The protection of alcoholic steroid hydroxyl groups, by forming their 2-(tetrahydropyranyl) ethers, is accomplished according to the method of the present invention by mixing the nuclear alcoholic hydroxy-steroid compound and dihydropyran, adding a catalytic amount of an acid, and allowing the reaction to proceed at a suitable temperature until formation of the 2-tetrahydropyranyl ether is complete. An inert diluent may be used, with ethers such as diethyl ether or an excess of dihydropyran being preferred as diluents. Suitable acid catalysts are the protonic acids such as hydrochloric acid, sulfuric acid, and the like, and non-protonic acids such as toluene sulfonic acid, boron trifluoride etherate, and the like, with hydrochloric acid being preferred, particularly for those steroid compounds which are sensitive to other acids. Temperatures between zero and 100 degrees centigrade are suitable for formation of the tetrahydropyranyl ethers of the invention, but temperatures below fifty degrees centigrade are preferred, in part due to the rate of decomposition of dihydropyran at higher temperatures. While temperatures between zero and fifty degrees centigrade constitute a preferred temperature range, the tetrahydropyranyl ether formation can be carried out under average room temperatures of between twenty and thirty degrees centigrade by allowing the reaction to proceed under these conditions for a period up to several days, and this factor is of particular value in the practice of certain embodiments of this invention. The fact that the tetrahydropyranyl group can be introduced under such mild conditions is of especial value where labile steroid compounds are concerned, but is also useful when working with the more stable compounds.

After the tetrahydropyranyl ether formation is complete, the catalyst is removed by neutralization with solid or aqueous alkali, sodium hydroxide, sodium carbonate, and the like, being preferred. Any excess alkali remaining may be removed by washing with water or in any other appropriate manner. The diluent, if used, is then removed and the resulting steroid 2-tetrahydropyranyl ether crystallized from a suitable solvent.

The protective method of the present invention finds especial use when it is desired to protect and reintroduce steroid alcoholic hydroxyl groups when other easily hydrolyzable groups, such as an ester group, are also present in the molecule, as it is possible to hydrolyze the tetrahydropyranyl ether group without the simultaneous hydrolysis of even the most labile ester group, such as the acetate. The hydrolysis of the tetrahydropyranyl ethers being accomplished by such mild acidic conditions, a preferred use of the protective method of this invention relates to the protection of nuclear alcoholic steroid hydroxyl groups during chemical reactions carried out under neutral or alkaline reaction conditions, its use under acidic reaction conditions being practical only when the conditions are not sufficiently strenous to hydrolyze the tetrahydropyranyl ether.

The method of this invention has been described, and is of value, without respect to the location of the alcoholic hydroxyl group or groups desired to be protected in the cyclopentanopolyhydrophenanthrene nucleus. The location of other groups attached to the nucleus has not been specifically described, as, in general, the scope and limitations of the other groups will depend upon the various chemical transformations, other than hydroxyl protection, desired to be accomplished, and are already well known to those familiar with the field of steroid chemistry. A preferred form of the present invention relates to the protection of alcoholic, or alicyclic, hydroxyl groups in the 3-position of the steroid nucleus, as this is the most usual and important hydroxyl group for which protection is required. Another preferred embodiment of the invention relates to the protection of a 3-alicyclic hydroxyl group in a steroid compound having substituents located at the 17-position of the nucleus, as this class of compounds is of great importance in the synthesis of compounds having physiological activity.

Specific examples of certain preferred forms of the invention are given below for purposes of illustration only, and are in no way to be construed as limiting.

*Example 1.—Dehydroepiandrosterone,3-(2'-tetrahydropyranyl) ether*

To a mixture of one part of dehydroepiandrosterone, 1.16 parts of freshly-distilled dihydropyran, and 29 parts of peroxide-free diethyl ether was added 0.05 part of concentrated hydrochloric acid and the reaction mixture allowed to stand at room temperature (25–30 degrees centigrade) for about sixty hours. Excess acid was removed by the addition of a small quantity of solid sodium hydroxide, the solution filtered immediately, the filtrate washed with water until neutral and then dried. The residue, after removal of ether and crystallization, gave one of the two stereoisomeric forms of dehydroepiandrosterone,3-(2'-tetrahydropyranyl) ether resulting from the new asymmetric carbon atom in the pyranyl group, melting at 192–194 degrees centigrade, $[a]_D^{25}$ minus 71.9 degrees (chloroform) and a mixture of the two isomeric forms melting at 172–173 degrees centigrade, $[a]_D^{25}$ plus 25.0 degrees, with the higher melting form predominating.

In a similar manner testosterone, 17-(2'-tetrahydropyranyl) ether, melting point 125–127 degrees centigrade, is obtained from testosterone.

*Example 2.—5-androstene-3-beta, 17-beta-diol, 3-(2'-tetrahydropyranyl) ether*

To one part of lithium aluminum hydride, dissolved in 200 parts of anhydrous diethyl ether, there was added three parts of the higher melting form of dehydroepiandrosterone,3-(2'-tetrahydropyranyl) ether, from Example 1, and the reaction mixture heated under reflux for an additional one and one-half hours. The excess aluminum hydride was decomposed by adding a solution of ten percent ethyl acetate in ether. The reaction complex was then hydrolyzed with one hundred parts of five percent sodium hydroxide solution, the ethereal layer separated, washed with water, dried, and the ether removed. After crystallization from acetone, 2.85 parts of 5-androstene-3-beta,17-beta-diol,3-(2'-tetrahydropyranyl) ether, melting at 161–162 degrees centigrade, was obtained.

*Example 3.—Pregnenolone, 3-(2'-tetrahydropyranyl) ether*

To a solution of 9.5 parts of pregnenolone, in 200 parts of freshly-distilled dihydropyran, was added 0.1 part of concentrated hydrochloric acid and the reaction mixture allowed to stand at room temperature (twenty to thirty degrees centigrade) for twelve days. The reaction mixture was diluted with 1500 parts of diethyl ether and shaken with ten percent sodium hydroxide solution, washed with water until neutral, dried, and the ether removed. The pregnenolone, 3-(2'-tetrahydropyranyl) ether thus obtained, after crystallization from isopropyl ether, melted at 129–130 degrees centigrade, $[a]_D^{24}$ plus 16.65 degrees (chloroform).

*Example 4.—Methyl-3-beta-hydroxybisnor-5-cholenate, 3-(2'-tetrahydropyranyl) ether*

To a solution of 3.6 parts of methyl-3-beta-hydroxybisnor-5-cholenate and 1.3 parts of freshly-distilled dihydropyran, dissolved in a mixture of one hundred parts of dry ether and 25 parts of dry benzene, was added 0.05 part of concentrated hydrochloric acid and the reaction mixture allowed to stand at room temperature for four days. The solution was washed with ten percent sodium hydroxide solution, dilute acetic acid solution, water until neutral, dried, and the solvent removed. The methyl 3-beta-hydroxybisnor-5-cholenate, 3-(2'-tetrahydropyranyl) ether, thus obtained, after crystallization from isopropyl ether, melted at 135–136 degrees centigrade, $[a]_D^{25}$ minus 48.84 degrees (chloroform).

*Example 5*

In a manner similar to that of Examples 1, 3, and 4, the following tetrahydropyranyl ethers were obtained.

1. Cholesterol, 3-(2'-tetrahydropyranyl) ether, melting at 158–159 degrees centigrade after crystallization from methyl ethyl ketone, $[a]_D^{25}$ minus 23.46 (chloroform).

2. 17-[2''-(1'',1''-diphenyl)propene - 1]-3-hydroxy etio-5-cholene, 3-(2'-tetrahydropyranyl) ether, melting at 176–177 degrees centigrade after crystallization from a mixture of ethyl acetate and ethyl alcohol, $[a]_D^{25}$ plus 224.4 degrees (chloroform).

3. Stigmasterol, 3 - (2' - tetrahydropyranyl) ether, melting at 162–163 degrees centigrade after crystallization from isopropyl ether, $[a]_D^{25}$ minus 54.5 (chloroform).

*Example 6.—5-androstene-3-beta, 17-beta-diol, 3-(2'-tetrahydropyranyl) ether-17-propionate*

To a solution of 5-androstene-3-beta, 17-beta-diol, 3-(2'-tetrahydropyranyl) ether from Example 2, dissolved in six parts of pyridine and cooled to five degrees centigrade, was added 3.5 parts of propionic anhydride. The reaction mixture was allowed to stand at room temperature for six days, then diluted with one hundred parts of ether. The ether solution was washed successively with cold solutions of ten percent sodium carbonate and water. The ether solution was dried, treated with adsorbent charcoal, filtered, and the solvent removed. There was obtained 5-androstene-3-beta, 17-beta-diol, 3-(2'-tetrahydropyranyl) ether-17-propionate, melting at 128–129 degrees centigrade after crystallization from a mixture of nine parts of ethyl alcohol and one part methyl alcohol.

*Example 7.—5-androstene-3-beta, 17-beta-diol, 3-(2'-tetrahydropyranyl) ether-17-beta-cyclopentylpropionate*

To a solution of 1.87 parts of 5-androstene-3-beta, 17-beta-diol, 3-(2'-tetrahydropyranyl) ether from Example 2, dissolved in six parts of pyridine and cooled to zero degrees centigrade, was added 0.97 part of beta-cyclopentylpropionyl chloride and the reaction mixture allowed to stand overnight at room temperature. The reaction mixture was diluted with one hundred parts of ether and washed successively with cold ten percent sodium carbonate, five percent acetic acid, five percent sodium bicarbonate solution, water, dried, and the solvent removed. There was thus obtained 5-androstene-3-beta, 17-beta-diol, 3-(2'-tetrahydropyranyl) ether-17-beta-cyclopentylpropionate, melting at 134.5–136.5 degrees centigrade after crystallization from a mixture of nine parts of ethyl alcohol and one part of methyl alcohol, $[\alpha]_D^{26}$ minus 40.37 degrees (chloroform).

*Example 8*

In a manner similar to that of Example 7, the following 17-esters of 5-androstene-3-beta, 17-beta-diol, 3-(2'-tetrahydropyranyl) ether were prepared using the appropriate acid chloride:

1. 17-diethylacetate (or 17-alpha-ethylbutyrate), melting at 83.5–84.5 degrees centigrade.
2. 17 - beta - phenylpropionate, melting at 113.5–115 degrees centigrade, $[\alpha]_D^{26}$ minus 59.88 degrees (chloroform).
3. 17-benzoate, melting at 191.5–194 degrees centigrade, $[\alpha]_D^{26}$ minus 23.51 degrees (chloroform).
4. 17-cyclohexanoate, melting at 159–161 degrees centigrade, $[\alpha]_D^{26}$ minus 42.10 degrees (chloroform).
5. 17-n-dodecanoate, melting at 95–96 degrees centigrade.

*Example 9.—5-androstene-3-beta, 17-beta-diol, 17-cyclopentylpropionate*

To a solution of nine parts of 3-beta, 17-beta-diol, 3-(2'-tetrahydropyranyl) ether-17-cyclopentylpropionate, dissolved in one hundred parts of boiling ethyl alcohol, was added twenty parts of water and two parts of concentrated hydrochloric acid (36 percent HCl) and the solution heated under reflux for 45 minutes. The reaction mixture was cooled and the resulting precipitate collected, washed with cold ethyl alcohol and dried. There was thus obtained 5.2 parts of 5-androstene-3-beta, 17-beta-diol-17-cyclopentylpropionate, melting at 134–136 degrees centigrade. An additional 0.8 part of this product, melting at 136–137 degrees centigrade after crystallization from alcohol, was obtained by concentration of the mother liquor.

Although certain preferred forms of this invention have been described in the specific examples above, it is to be understood that other forms of the invention may be employed. While the substituents on the steroid nucleus have been specifically described with respect to the 3 and 17 positions, it will be appreciated that other positions, which are subject to chemical reactions, can be substituted, or that other positions which carry hydroxyl groups can have the hydroxyl groups protected by the method of this invention.

Other representative compounds within the scope of the invention include androsterone tetrahydropyranyl ether; stigmasterol, pregnenolone, ergosterol, dehydroergosterol, ergosterol and dehydroergosterol maleic anhydride, acid, and ester adduct, and the like tetrahydropyranyl ethers, all of which are prepared from the corresponding steroid alcohol in the manner described herein.

Still other modifications and equivalents will be apparent to one skilled in the art to which this invention pertains.

Among the novel tetrahydropyranyl ethers of the present invention are those of the foregoing illustrative examples and description. A preferred embodiment of the invention includes the tetrahydropyranyl ethers of 3-hydroxy steroids, having an alicyclic A ring. The novel compounds preferably have no substituents on the cyclopentanodimethylpolyhydrophenanthrene nucleus, other than one or more double bonds, except at the 3 and 17 positions, since the compounds are of greater importance in synthesis, although the presence of other substituents does not alter the effectiveness of the process herein described, or detract from the value of the compounds having such substituents.

These substituents may be as indicated in the foregoing, hydroxy, keto, and esters of hydroxy groups being preferred. An especial embodiment of the invention resides in the 17 esters of 3,17-steroid diol, 3-tetrahydropyranyl ethers, wherein the esterifying radical is preferably an acid containing up to twelve carbon atoms, inclusive, such as formic, acetic, propionic, butyric, hexanoic, isovaleric, octanoic, benzoic, dodecanoic, and the like. The 17-esters of 5-androstene-3,17-diol, 3-(2'-tetrahydropyranyl) ethers are especially useful in the preparation of testosterone esters.

It is to be understood that the invention is not limited to the exact details or compounds shown and described, as obvious modifications and substitutions of equivalents may be made in the present invention without departing from the spirit or scope thereof, which will be apparent to one skilled in the art, and we therefore limit ourselves only as defined in the appended claims.

We claim:

1. A method for the protection of a steroid alcoholic hydroxyl group by conversion to a tetrahydropyranyl ether group, consisting of forming the 2-tetrahydropyranyl ether of said steroid alcoholic hydroxyl group mixing the steroid alcohol with dihydropyran in the presence of a catalytic amount of an acid at a temperature between about zero and one hundred degrees centigrade.

2. The method of claim 1, wherein the reaction temperature is between about zero and fifty degrees centigrade.

3. The method of claim 1, wherein the reaction temperature is between about twenty and about thirty degrees centigrade.

4. The method of claim 1, wherein the acid catalyst is hydrochloric acid.

5. The method of claim 1, wherein the hydroxyl group to be protected is in the 3-position of the steroid nucleus.

6. The method of claim 1, wherein the starting steroid is testosterone.

7. The method of claim 1, wherein the starting steroid is a 17-substituted steroid 3-hydroxy compound having an alicyclic A ring, said 17-substituent being selected from hydrocarbon side chains containing up to fifteen carbon atoms, inclusive, a two-carbon-atom side-chain containing a ketone (=O) group, and hydrocarbon side chains bearing a carbalkoxy (COOCH₃) group having up to a total of six carbon atoms.

8. The method of claim 1, wherein the starting steroid is pregnenolone.

9. A method for the protection of steroid alcoholic hydroxyl groups in the 3-position of a steroid nucleus having an alicyclic A ring, consisting of forming the 2-tetrahydropyranyl ether of said alcoholic 3-hydroxyl group by mixing the steroid 3-alcohol with dihydropyran at a temperature between about zero and about one hundred degrees centigrade in the presence of a catalytic amount of an acid.

10. The method of claim 9, wherein the reaction temperature is between about zero and fifty degrees centigrade.

11. The method of claim 9, wherein the reaction temperature is between about twenty and about thirty degrees centigrade.

12. The method of claim 9, wherein the acid catalyst is hydrochloric acid.

13. The method of claim 9, wherein the starting 3-hydroxy steroid contains a saturated A ring.

14. The method of claim 9, wherein the starting steroid is 5-androstene-3,17-diol.

15. The method of claim 9, wherein the starting steroid is dehydroepiandrosterone.

16. The method of claim 9, wherein the starting steroid is a 5-androstene-3,17-diol 17-ester, wherein the esterifying group in the 17-position is the radical of an organic monocarboxylic acid containing up to 12 carbon atoms, inclusive.

17. The method of claim 9, wherein the starting steroid compound is 5-androstene-3, 17-diol, 17-cyclopentylpropionate.

18. The method of claim 9, wherein the starting steroid is a 3,17-steroid diol 17-ester, wherein the esterifying group in the 17 position is the radical of an organic monocarboxylic acid containing up to 12 carbon atoms, inclusive.

19. A 2-tetrahydropyranyl ether of a steroid 3-hydroxy compound having an alicyclic A ring.

20. A 3-(2'-tetrahydropyranyl) ether of a 17-substituted steroid 3-hydroxy compound having an alicyclic A ring, wherein the 17-substituent is selected from the group consisting of hydrocarbon side-chains containing up to fifteen carbon atoms, inclusive, a two-carbon-atom side-chain containing a ketone (=O) group, and hydrocarbon sidechains bearing a carbomethoxy (COOCH₃) group having up to a total of six carbon atoms.

21. A 3,17-steroid diol, 3-(2'-tetrahydropyranyl) ether-17-ester, having an alicyclic A ring, wherein the group in the 17 position has the formula RCOO—, wherein R is selected from hydrogen and a hydrocarbon radical containing up to 11 carbon atoms, inclusive.

22. A 5-andostene-3,17-diol, 3-(2'-tetrahydropyranyl) ether-17-ester, wherein the group in the 17 position has the formula RCOO—, wherein R is selected from hydrogen and a hydrocarbon radical containing up to 11 carbon atoms, inclusive.

23. 5-androstene-3-beta, 17-beta-diol, 3-(2'-tetrahydropyranyl) ether-17-beta-cyclopentylpropionate.

24. Dehydroepiandrosterone, 3 - (2' - tetrahydropyranyl) ether.

25. 5-androstene-3-beta, 17-beta-diol, 3-(2'-tetrahydropyranyl) ether.

26. A 2-tetrahydropyranyl ether of a steroid hydroxy compound wherein the hydroxyl group is attached to an alicyclic ring and is in a position selected from the 3 and 17 positions.

27. Testosterone, 17 - (2' - tetrahydropyranyl) ether.

28. Pregnenolone, 3 - (2' - tetrahydropyranyl) ether.

29. A 2-tetrahydropyranyl ether of a steroid 3-hydroxy compound having a saturated A ring.

ARNOLD C. OTT.
MAXTON F. MURRAY.

References Cited in the file of this patent

UNITED STATES PATENTS

| Number | Name | Date |
|---|---|---|
| 2,302,636 | Koster | Nov. 17, 1942 |

OTHER REFERENCES

Fujii, Chem. Abst. 32, col. 5847 (1938).
Huffman, Journ. Biol. Chem. 172, 789–795 (1948).